(12) United States Patent
McMahan

(10) Patent No.: US 10,070,747 B2
(45) Date of Patent: Sep. 11, 2018

(54) SYSTEMS AND METHODS FOR LEAD-INS FOR ANTI-FATIGUE FLOOR MATS

(71) Applicant: Let's Gel Incorporated, Austin, TX (US)

(72) Inventor: Robert L. McMahan, Austin, TX (US)

(73) Assignee: Let's Gel Inc., Austin, TX (US)

( * ) Notice: Subject to any disclaimer, the term of this patent is extended or adjusted under 35 U.S.C. 154(b) by 0 days.

(21) Appl. No.: 15/079,094

(22) Filed: Mar. 24, 2016

(65) Prior Publication Data

US 2017/0273490 A1    Sep. 28, 2017

(51) Int. Cl.
| | |
|---|---|
| *A47G 27/02* | (2006.01) |
| *B32B 25/10* | (2006.01) |
| *B32B 5/20* | (2006.01) |
| *B29K 75/00* | (2006.01) |
| *B29K 105/04* | (2006.01) |
| *B29L 31/00* | (2006.01) |
| *B29C 44/02* | (2006.01) |
| *B29C 44/12* | (2006.01) |
| *B29C 44/14* | (2006.01) |

(52) U.S. Cl.
CPC ............ *A47G 27/0231* (2013.01); *B32B 5/20* (2013.01); *B32B 25/10* (2013.01); *B29C 44/025* (2013.01); *B29C 44/1266* (2013.01); *B29C 44/14* (2013.01); *B29K 2075/00* (2013.01); *B29K 2105/04* (2013.01); *B29K 2713/00* (2013.01); *B29L 2031/7324* (2013.01); *B32B 2471/04* (2013.01)

(58) Field of Classification Search
CPC ....... E04B 1/169; E04H 15/20; E04H 15/201; E04H 15/202; E04H 15/205; A47G 27/0231; A47G 27/00; A47G 27/02; A47G 27/0212; A47G 27/0218; A47G 27/0268; A47G 27/0281; B29C 2471/04; B29L 2031/7324

See application file for complete search history.

(56) References Cited

U.S. PATENT DOCUMENTS

| | | | | |
|---|---|---|---|---|
| 2,850,252 | A * | 9/1958 | Ford | B64F 1/36 114/261 |
| 3,526,564 | A * | 9/1970 | Crawford | A47L 23/266 428/131 |
| 5,028,468 | A * | 7/1991 | Taylor | A47G 27/0206 428/192 |
| 5,437,068 | A * | 8/1995 | Fisher | A47C 27/087 5/420 |
| 5,630,237 | A * | 5/1997 | Ku | A47C 27/084 5/420 |
| 6,065,164 | A * | 5/2000 | Swanger | A47G 9/0246 5/420 |
| 7,819,778 | B1 * | 10/2010 | Sudeith | A63B 6/00 482/37 |
| 9,085,909 | B2 * | 7/2015 | Kanter | E04F 15/22 |
| 9,216,122 | B2 * | 12/2015 | Dzioba | A61G 7/05776 |
| 2009/0130373 | A1 * | 5/2009 | Sharir | A47L 23/266 428/95 |

(Continued)

*Primary Examiner* — Jessica L Laux
(74) *Attorney, Agent, or Firm* — Pierson IP, PLLC (57) ABSTRACT

Examples of the present disclosure are related systems and methods for lead-ins for anti-fatigue floor mats. More particularly, embodiments disclose lead-ins with tapered ends with variable heights that transition from a floor level to a mat surface level to enable drop stitch-mats to be used in residential and commercial areas.

9 Claims, 10 Drawing Sheets

(56) References Cited

U.S. PATENT DOCUMENTS

| | | | |
|---|---|---|---|
| 2013/0007787 A1* | 1/2013 | John | H04N 21/42203 725/10 |
| 2013/0084413 A1* | 4/2013 | McMahan | B32B 5/18 428/33 |
| 2016/0007787 A1* | 1/2016 | Johnson | A47G 27/0231 428/58 |

* cited by examiner

SYSTEMS AND METHODS FOR LEAD-INS FOR ANTI-FATIGUE FLOOR MATS

BACKGROUND INFORMATION

Field of the Disclosure

Examples of the present disclosure are related systems and methods for lead-ins for anti-fatigue floor mats. More particularly, embodiments disclose lead-ins with tapered ends with variable heights that transition from a floor level to a mat surface level to enable drop stitch-mats to be used in residential and commercial areas.

Background

Anti-fatigue floor mats are often used to enhance the comfort of those standing for extended periods of time. Conventional anti-fatigue mats are manufactured in a variety of ways, but typically include a combination of a decorative pattern and resilient materials that provide cushioning.

Inflatable devices have been used as floor mats, floatation devices, or bedding. However, conventional inflatable devices are too soft and flexible for operational floor mats. To overcome these deficiencies, when used as floor mats conventional inflatable devices have incorporated drop-stitched construction of double wall fabric. Drop stitched construction provides tensional thread elements between two opposing surfaces allowing an inflated device to handle higher pressures and remain more rigid. These systems are used in inflatable boat flooring, stand-up paddleboards, docks, and even airplane wings. However, these systems are not used in commercial or residential floor mats due to their thickness and cornered ends.

Accordingly, needs exist for more effective and efficient systems and methods for a transition element, such as lead-ins configured to transition ends of an anti-fatigue mat from a floor level to a mat surface level.

SUMMARY

Embodiments disclosed herein describe mat systems and methods configured to provide anti-fatigue mats with lead-ins. The lead-ins are configured to transition from a floor level to an elevated mat surface level. Embodiments may be compatible with current anti-fatigue floor mats, including inflatable devices incorporating drop-stitch technology. The lead-ins may allow drop-stitch constructions used as floor mats to be used in residential, commercial, and industrial settings. Embodiments may also include the inherent advantages of drop-stitch constructions, such as portability, durability, light weight in transport, etc.

Embodiments of a drop-stitch floor mat may be configured to transform hard standing surfaces, such as tile, concrete, wood, etc. found in work environments in the home or workplace, into a cushioned anti-fatigue standing area, which may improve a user's comfort and productivity. Additionally, embodiments may be configured to be light weight for easy transport, easy to inflate and deflate, implemented with different air pressures, and easily deflated, rolled, and transported. In embodiments, finished materials may be joined together through factory bonding or via after-market hardware techniques, which may provide anti-fatigue floor mats of different widths and lengths.

Embodiments may include an anti-fatigue mat system comprising an anti-fatigue mat configured to be inflated, the anti-fatigue mat may have a flat planar surface, wherein a height of a top surface of the anti-fatigue mat remains constant. The anti-fatigue mat system may also include a lead-in configured to be positioned proximate to a sidewall of the anti-fatigue mat, a height of a top surface the lead-in having varying heights, wherein the height of the top surface of the lead-in proximate to an edge of the lead-in is shorter than the height of the top surface of the lead-in proximate to the sidewall of the anti-fatigue mat.

In embodiments, the lead-in includes tensional support members extending from the top surface of the lead-in to a bottom surface of the lead-in, the tensional support members positioned proximate to the edge of the lead-in being shorter than the tensional support members of the lead-in positioned proximate to the sidewall of the anti-fatigue mat.

Embodiments may also include a plurality of lead-ins, each of the plurality of leads-ins being configured to be positioned proximate to an edge of the anti-fatigue mat, wherein adjacent lead-ins include ends that form complementary angles.

Embodiments may also include an end cap being configured to be positioned between the lead-in and the anti-fatigue mat.

Embodiments may also include a first top fabric configured to be positioned over the anti-fatigue mat, a first bottom fabric configured to be positioned below the anti-fatigue mat. Furthermore, a second top fabric may be configured to be positioned over the first top fabric and the lead-in, and a second bottom fabric may be configured to be positioned under the first bottom fabric, wherein at least a portion of the second top fabric is configured to be positioned below the second bottom fabric.

Embodiments may also include a coupling mechanism including a base and a projection, the projection extending in a direction perpendicular to a floor surface, wherein the projection is configured to be inserted into a hollow channel within the lead-in.

Embodiments may also include a plurality of hollow channels positioned within the lead-in. A bottom fabric of embodiments may have a perimeter extending past edges of the anti-fatigue mat. The bottom fabric may include orifices extending through the bottom fabric that are configured to align with the plurality of hollow channels, wherein a plurality of coupling mechanisms are configured to be inserted through the orifices into the plurality of hollow channels.

Embodiments of a lead-in may include a first section of the lead-in positioned above a second section of the lead-in, the first section of the lead-in including a first hollow channel extending into the first section, the second section of the lead in including a second hollow channel extending through the second section. In embodiments, an end cap may be configured to be positioned between the lead-in and the anti-fatigue mat, the end cap may include a tab extending into the lead-in in a direction in parallel to a base of the coupling mechanism, and the tab may include an orifice extending through the tab.

In embodiments, the anti-fatigue mat may include an inflatable sidewall, and the lead-in includes a slot, responsive to inflating the inflatable sidewall the anti-fatigue mat may be configured to be coupled with the lead-in.

In embodiments, a bridging element may be configured to couple a first anti-fatigue mat and a second anti-fatigue mat.

To this end, embodiments may create a lead-in for current drop-stitch mat technology, wherein the lead-in may be coupled to drop-stitch mats in a plurality of different ways. The addition of a lead-in may convert a drop-stitch mat into an anti-fatigue mat that may be utilized in residential and commercial settings. Embodiments may be produced in a plurality of different lengths and widths, with different number of mats, which may be joined together to produce products of various shapes and sizes.

Embodiments may also incorporate a pressure relief valve. The pressure relief valve may be configured to maintain or control the internal pressure of an anti-fatigue mat at a desired pressure correlating to a specific comfort level. Typically seams of an anti-fatigue mat may rupture as the ambient temperature of an environment increases or an internal integrated pump causes the internal pressure of the anti-fatigue mat to increase. However, as the internal pressure of the anti-fatigue mat changes, the pressure relief valve may activate to maintain the internal pressure of the anti-fatigue mat.

As anti-fatigue mats are configured to be walked on, but also needs air for inflation, embodiments may also incorporate an integrated foot pump. The integrated floor pump may be configured to activate and provide additional air pressure whenever the anti-fatigue mat is stepped on. To keep the anti-fatigue mat from over-inflating, the pressure relief valve could be combined with an integrated foot pump to maintain the internal pressure of the anti-fatigue at the desired pressure.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe anti-fatigue floor mat systems, which may be inflated, utilize drop-stitch technology, and provide a transitional lead-in from a floor surface to an elevated mat surface. This may minimize, reduce, or eliminate tripping and/or other hazards. Embodiments may increase friction between a floor surface and the anti-fatigue mats, which may limit, reduce, minimize, etc. the movement or sliding of the anti-fatigue mats across the floor surface. Additionally, embodiments of anti-fatigue mats may increase the weight of the anti-fatigue mats, which may minimize the movement of the anti-fatigue mat when receiving force, such as being kicked or pushed.

Figure 1:
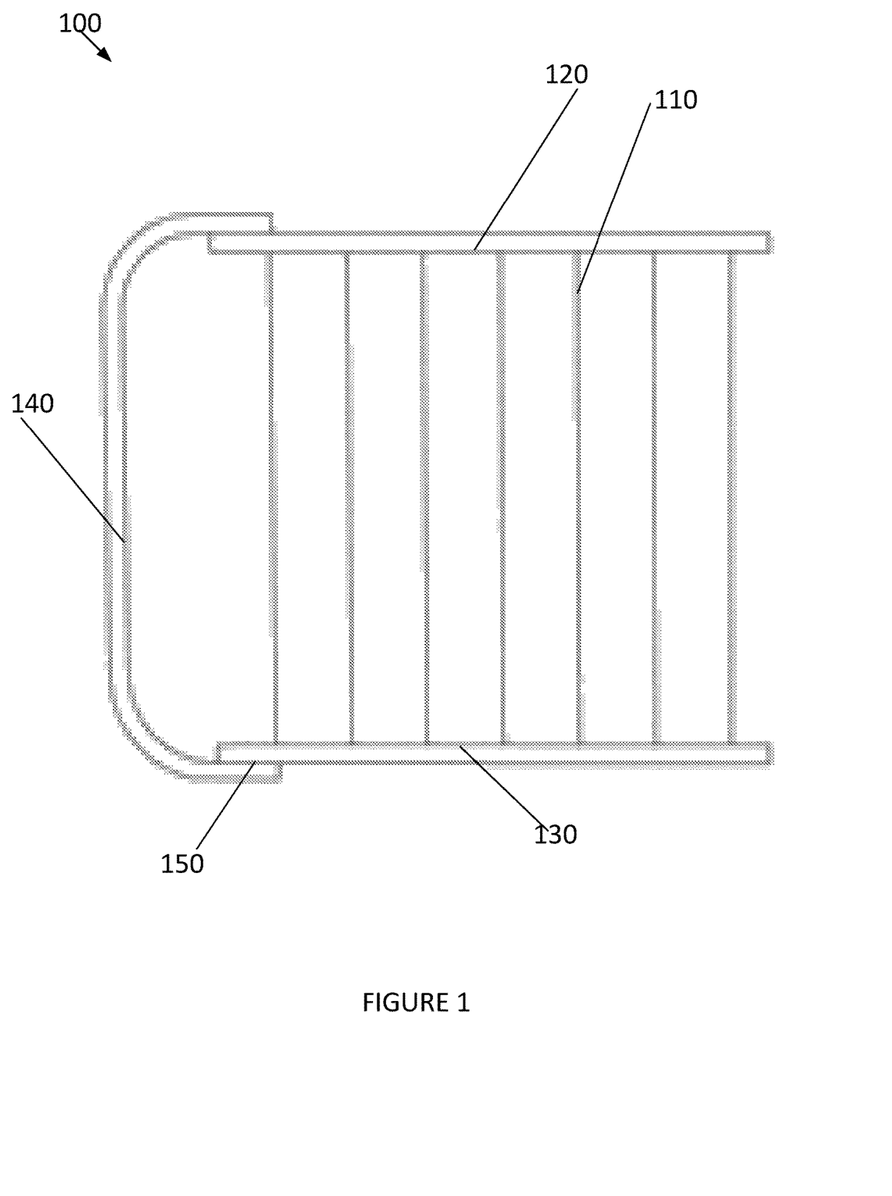
FIG. 1 depicts a conventional construction for an inflated device including drop-stitch technology.

FIG. 1 depicts a conventional construction for an inflated device 100 including drop-stitch technology. Conventional inflated device 100 may include a uniform height extending across the length and width of body of inflated device 100. The uniform height of inflated device 100 instantaneously elevates the mat surface at a vertical offset from the floor surface. This instantaneous vertical offset causes users to trip, stub their toes, and/or create other hazards. Inflated device 100 includes tensional support members 110, top fabric 120, bottom fabric 130, and end cap 140.

Tensional support members 110 are polyester threads extending from top fabric 120 to bottom fabric 130, and are created to be a fixed, equal height. In embodiments, inflated device 100 may include thousands of tensional support members 110 maintained in tension.

In use, top fabric 120 is configured to be positioned directly underneath the feet of users when inflated device 100. In use, bottom fabric 130 is configured to be positioned adjacent to a floor surface when inflated device 100.

End cap 140 is configured to be positioned over an edge of inflated device 100, wherein end cap 140 is adhered to inflated device 100. End cap 140 has a sidewall that is parallel to the direction of tensional support members 100. Additionally, end cap 140 is configured to overlap with portions of top fabric 120 and bottom fabric 130 to form overlapped joints 150, wherein the overlapped joints 150 couple end cap 140 with top fabric 120 and bottom fabric 130. However, in use, the outer surface of end cap 140 creates an instantaneous vertical offset extending from the floor surface to the top fabric 120. This instantaneous vertical creates hazards. To reduce, minimize, or eliminate the hazards, a transitional lead-in is desired that incrementally changes vertical offset height of the edges of anti-fatigue mat.

Figure 2:
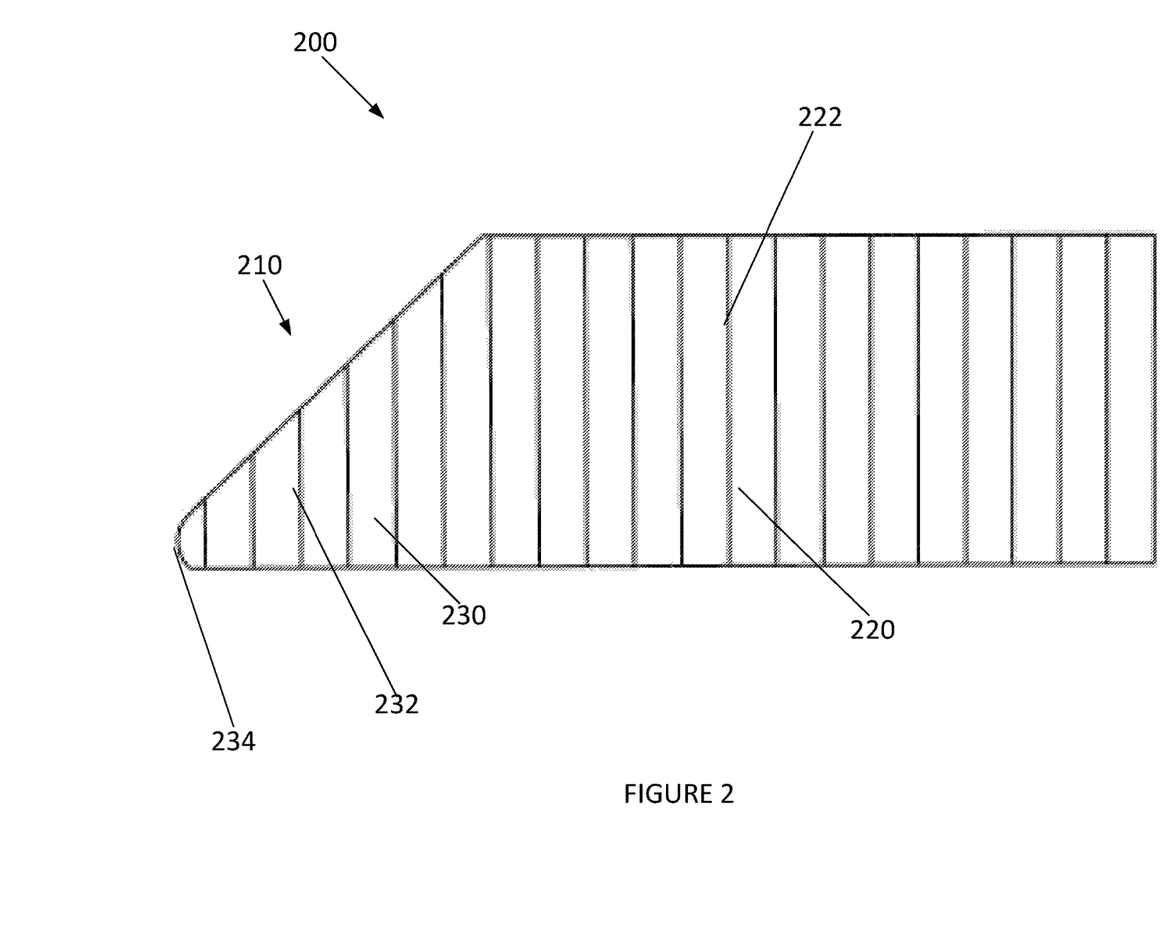
FIG. 2 depicts an anti-fatigue mat with a lead-in, according to an embodiment.

FIG. 2 depicts an anti-fatigue mat 200 with a lead-in 210, according to an embodiment.

Anti-fatigue mat 200 may be an anti-fatigue mat that implements drop-stitched construction of double wall fabric (referred to hereinafter collectively and individually as "drop-stitched" construction), which may be inflated between 15-20 psi. In other embodiments, anti-fatigue mat 200 may be any mat, cushion, inflatable device, which may incorporate features of inflated device 100. Anti-fatigue mat 200 may include a first section 220 and a second section 230.

First section 220 of anti-fatigue mat 200 may include tensional support members 222. Tensional support members 222 positioned in first section 220 may be comprised of polyester threads that extend from a top surface to a bottom surface of first section 220. Tensional support members 222 positioned in the first section 220 may be created at a fixed, equal height.

Second section 230 may have a tapered, sloped, etc. top surface, which gradually decreases the vertical distance between the bottom surface of second section 230 to the top surface of second section 230 to from lead-in 210. Tensional support members 232 positioned in second section 230 may be comprised of polyester threads, and may extend from a top surface to a bottom surface of second section 230. Tensional support members 232 within second section 230 may have varying heights corresponding to the tapering of lead-in 210, wherein tensional support members 232 positioned more proximate to first section 220 may have a greater height than tensional support members 232 positioned proximate to the edge 234. By varying the height of tension support members 232, lead-in 210 may be created.

In embodiments, a specialized machine may vary the length of tensional support members 232 to create lead-in 210. The specialized machine may vary the length of tensional support members 232 by utilizing needles of different lengths, wherein shorter needles may be positioned closer to edge 234 to create shorter tensional support members 232.

In further embodiments, an end cap (not shown) may be positioned on edge 234, over portions of second section 230, or completely cover second section 230. The edges of the end cap may create joint overlaps. When the end cap is overlaid over the top and bottom surfaces of anti-fatigue mat 200. Accordingly, the size of the end cap may vary.

Figure 3:
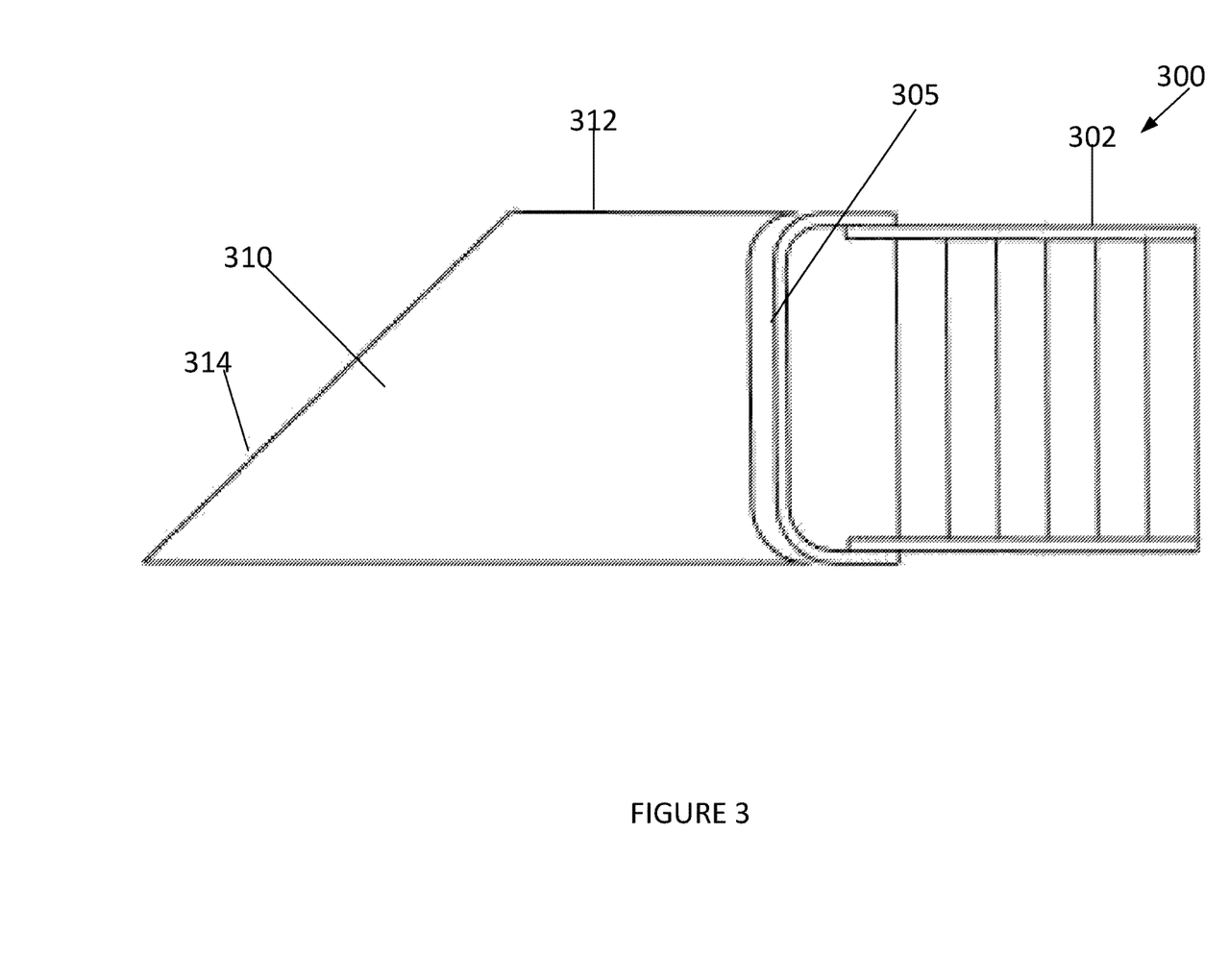
FIG. 3 depicts a lead-in integrated with an anti-fatigue mat, according to an embodiment.

FIG. 3 depicts a lead-in 310 integrated with anti-fatigue mat 300, according to an embodiment. Elements depicted in FIG. 3 may be substantially similar to those discussed above. For the sake of brevity, another description of these elements is omitted.

Lead-in 310 may be configured to convert anti-fatigue mat 300 with a planar top surface into an anti-fatigue mat with transitional edges. Thus, the converted anti-fatigue mat may to be used as residential and/or commercial floor mats.

As depicted in FIG. 3, lead-in 310 may be configured to be positioned adjacent to an outer surface of an end cap 305. Lead-in 310 may be comprised of various materials, which may be the same material or a different material than that of anti-fatigue mat 300. For example, lead-in 310 may be comprised of foamed urethane or any other material that adheres easily to other structures. Lead-in 310 may be coupled to end cap 305 in various manners, including adhesives, fasteners, or other coupling methods or devices.

A first top surface 312 of lead-in 310 may be substantially the same height as a top surface 302 of anti-fatigue mat 300. Yet, a second top surface 314 of lead-in 310 may have varying heights. Responsive to coupling lead-in 310 to end cap 305, anti-fatigue mat 300 may have a smooth transition from the floor surface to an elevated, anti-fatigue mat surface.

Figure 4:
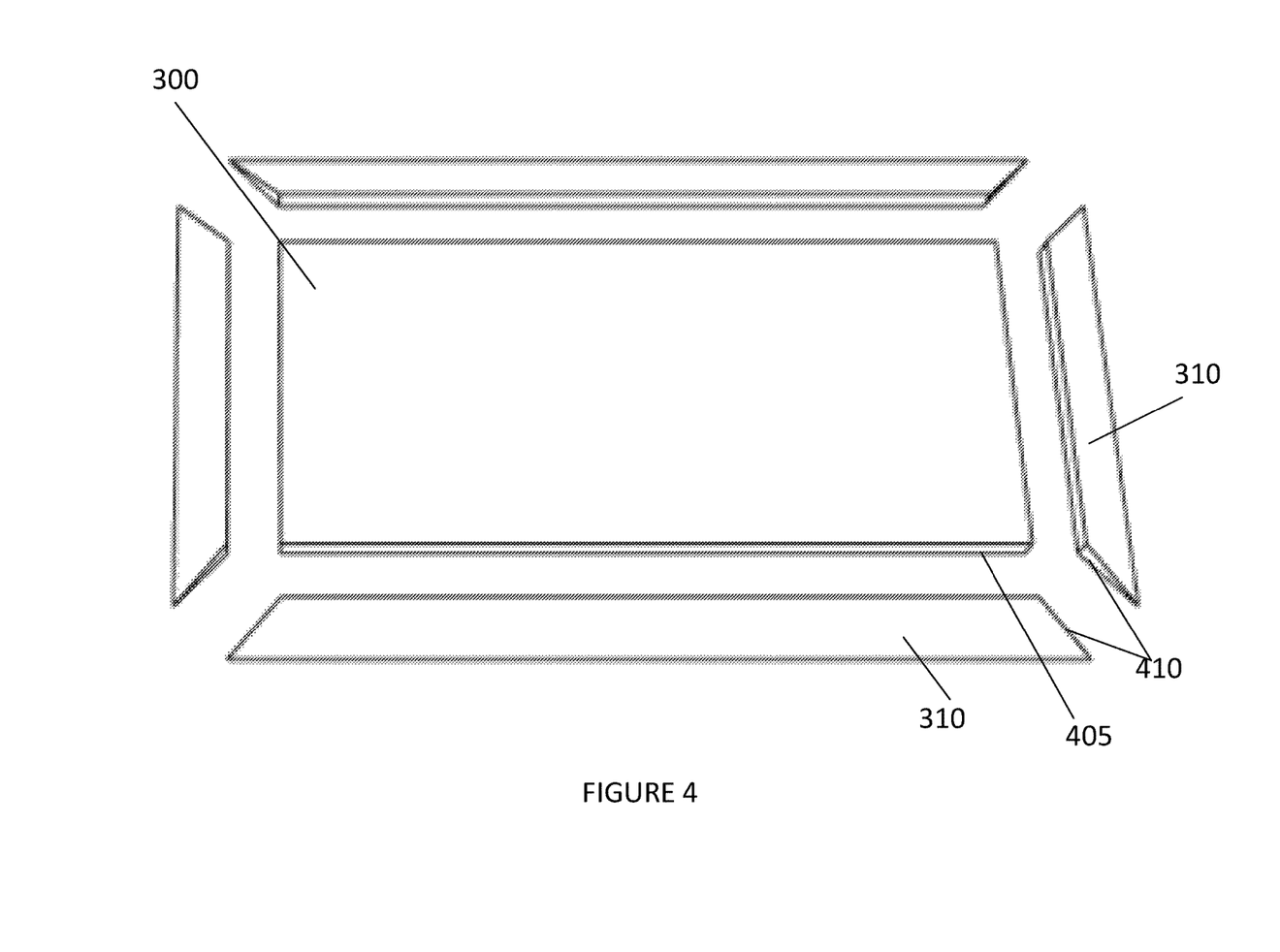
FIG. 4 depicts a plurality of lead-ins integrated with an anti-fatigue mat, according to an embodiment.

FIG. 4 depicts a plurality of lead-ins 310 integrated with anti-fatigue mat 300, according to an embodiment. Elements depicted in FIG. 4 may be substantially similar to those discussed above. For the sake of brevity, another description of these elements is omitted.

As depicted in FIG. 4, leads-ins 310 may be configured to be positioned over each exposed edge 405 of anti-fatigue mat 300. In embodiments, sidewalls 410 of adjacent lead-ins 310 may have complementary angles, such that a sidewall 410 of a first lead-in 310 and a sidewall 410 of a second lead-in 310 form a right angle. To this end, the corners of anti-fatigue mat 300 may transition via two lead-ins 310.

Figure 5:
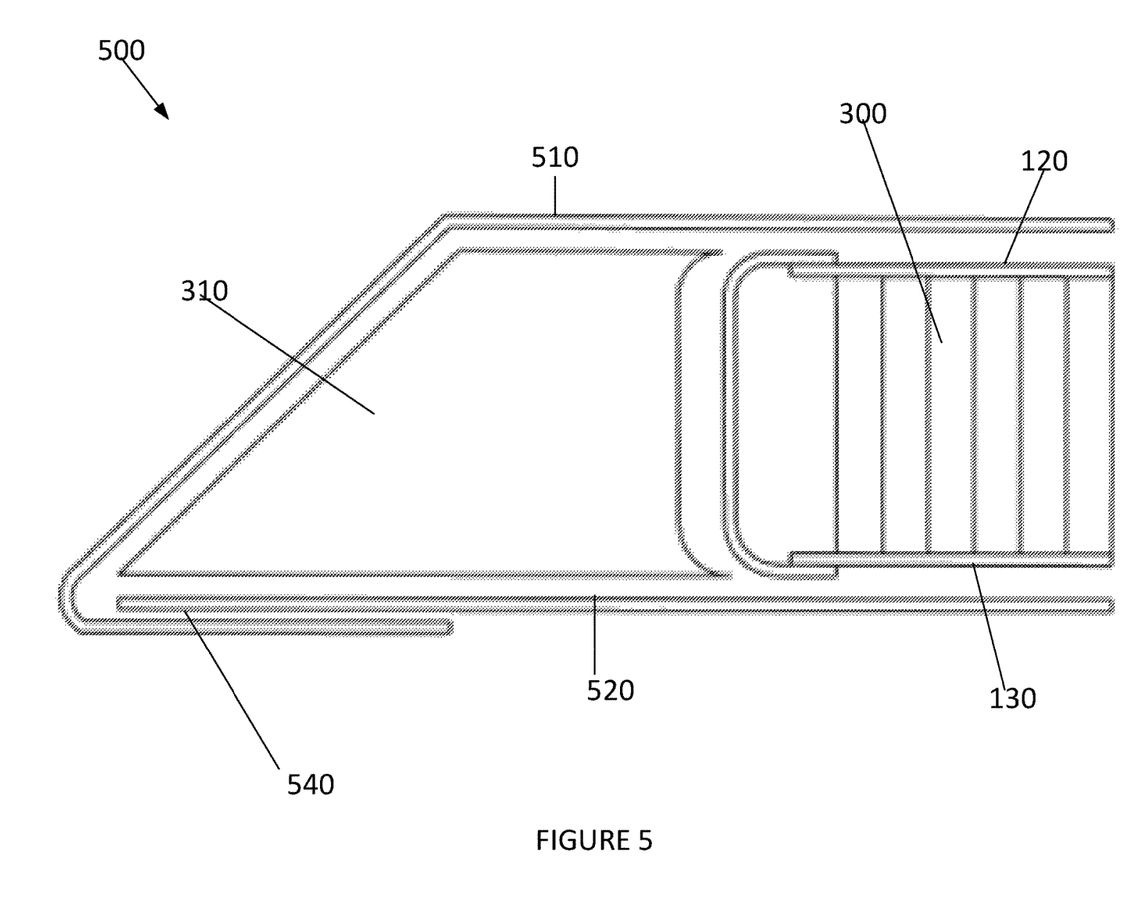
FIG. 5 depicts an anti-fatigue mat system with a lead-in and anti-fatigue mat, according to an embodiment.

FIG. 5 depicts an anti-fatigue mat system 500 with lead-in 310 and anti-fatigue mat 300, according to an embodiment. Elements depicted in FIG. 5 may be substantially similar to those discussed above. For the sake of brevity, another description of these elements is omitted.

As depicted in FIG. 5, anti-fatigue mat system 500 may include a second top fabric 510 and a second bottom fabric 520. Second top fabric 510 and second bottom fabric 520 may be comprised of different materials or the same materials. Second top fabric 510 may be comprised of a coated, resilient cushioned material, and second bottom fabric 520 may be comprised of a material configured to reduce the sliding of movement of anti-fatigue mat system 500. The coated material may enable anti-fatigue mat 300 to hold air.

Furthermore, second top fabric 510 may be comprised of the same and/or different material as top fabric 120, and second bottom fabric 520 may be comprised of the same and/or different material as bottom fabric 130.

Second top fabric 510 may be configured to be positioned adjacent to and over top surfaces of anti-fatigue mat 300 and lead-in 310. Additionally, second top fabric 510 may be positioned under and adjacent to portions of second bottom fabric 520. Accordingly, second top fabric 510 may adhere to, wrap around the exposed top surfaces of anti-fatigue mat 300 and lead-in 310, and also be positioned under anti-fatigue mat 300 and lead-310.

Second bottom fabric 520 may be configured to be positioned under and adjacent to anti-fatigue mat 300 and lead-in 310. Additionally, portions of second bottom fabric 520 may be configured to be positioned over portions of second top fabric 510.

In embodiments, the portion of second top fabric 510 that is positioned under second bottom fabric 520 may form a single exposed overlap joint 540, wherein overlap joint 540 may be positioned under lead-in 310 and/or anti-fatigue mat 300. Overlap joint 540 may be configured to be a removable joint, wherein second top fabric 510 may be decoupled from second top bottom fabric 520. Alternatively, overlap joint 540 may be configured to be a permanent and fixed joint, such that second top fabric 510 may not be decoupled from second bottom fabric 520.

Figure 6:
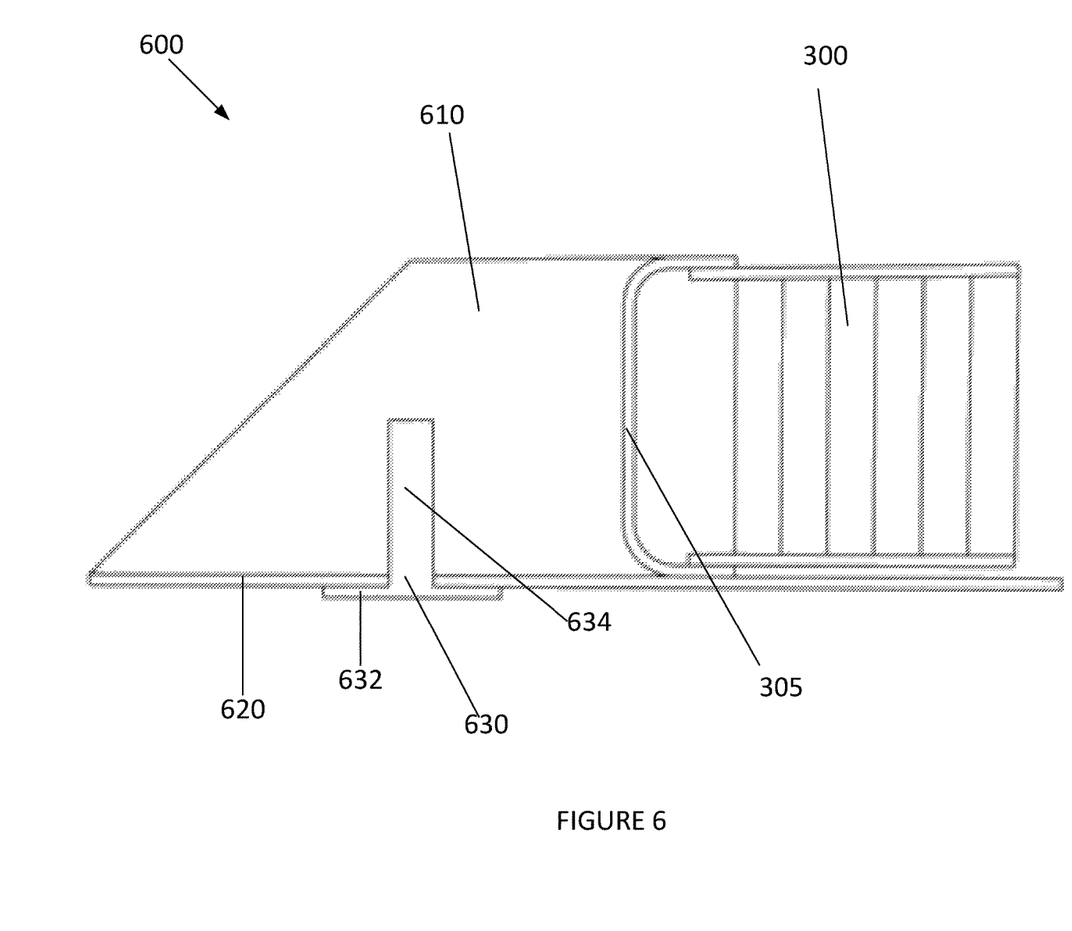
FIG. 6 depicts a side view of an anti-fatigue mat system with a lead-in and anti-fatigue mat, according to an embodiment.

FIG. 6 depicts a side view of an anti-fatigue mat system 600 with lead-in 610 and anti-fatigue mat 300, according to an embodiment. Elements depicted in FIG. 6 may be substantially similar to those discussed above. For the sake of brevity, another description of these elements is omitted. Anti-fatigue mat system 600 may include anti-fatigue mat 300, lead-in 610, second bottom fabric 620, and coupling mechanism 630.

Lead-in 610 may be configured to be positioned adjacent to an outer surface of an end cap 305 of anti-fatigue mat 300. A lower portion of lead-in 610 may include a hollow channel, passageway, groove, recessions, etc. extending into, but not through, lead in 610. The hollow channel may be configured to receive coupling mechanism 630. The hollow channel may extend in a direction in parallel to the longitudinal axis of tensional support members 110. In embodiments, the hollow channel may be vertically aligned with the intersection of the tapered portion of lead-in 610 and the planar top surface of lead-in 610.

Second bottom fabric 620 may be configured to be positioned below and adjacent to lead-in 610 and anti-fatigue mat 300. Second bottom fabric 620 may be comprised of non-slip material, and may include an orifice extending through second bottom fabric 620 that is configured to align with the hollow channel within lead-in 610. In embodiments, second bottom fabric 620 may be adhered to or removable from anti-fatigue mat 300.

Coupling mechanism 630 may be a fastener, rivet, clasp, etc. that is comprised of a soft material, which may be the same material or a different material than lead-in 610 and/or anti-fatigue mat 300. For example, coupling mechanism 630 may be comprised of flexible and semi-rigid materials, such as foam, polyurethane, or other materials that may be compressed and/or elongated. Coupling mechanism 630 may include a base 632 and projection 634.

Base 632 may have a first diameter and may be configured to be positioned below and adjacent to second bottom fabric 620. Projection 634 may have a second diameter that is smaller than the first diameter, and extend away from base 632 is a direction that is perpendicular to base 632. Projection 634 may be configured to be inserted through the orifice on second bottom fabric 620 and into the hollow channel within lead-in 610. Responsive to inserting projection 634 through the orifice and into the hollow chamber, lead-in 610, second bottom fabric 620, and anti-fatigue mat 300 may be removably coupled together.

Figure 7:
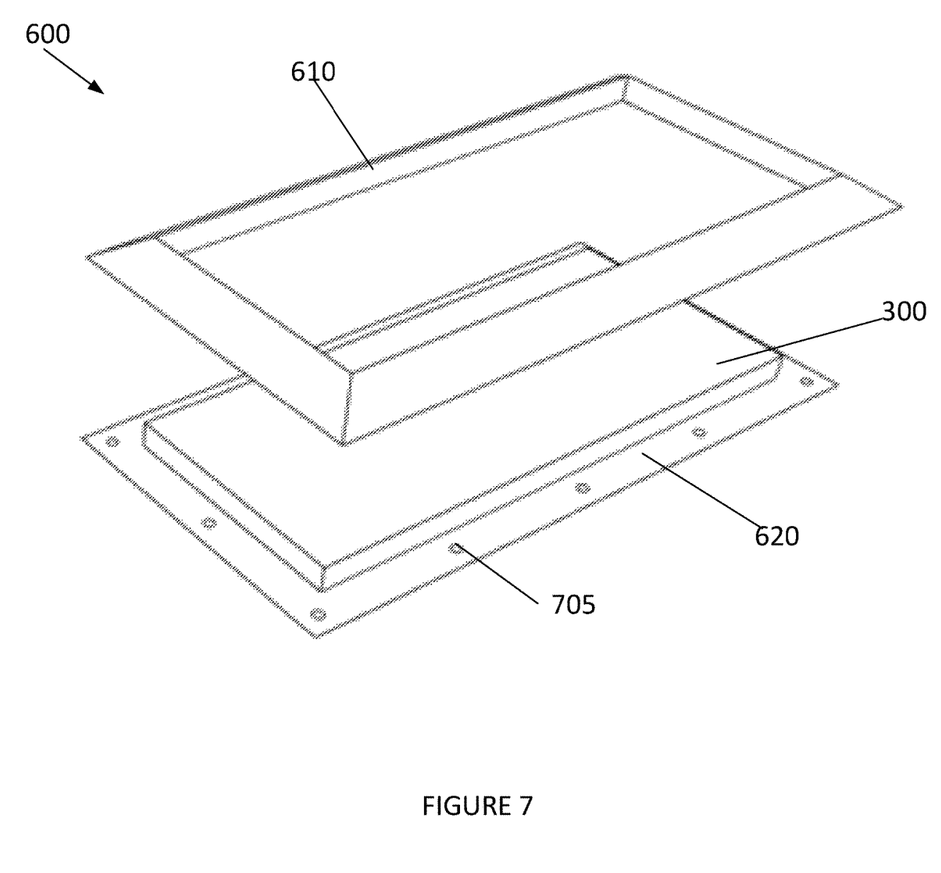
FIG. 7 depicts perspective view of an anti-fatigue mat system, according to an embodiment.

FIG. 7 depicts perspective view of anti-fatigue mat system 600, according to an embodiment. Elements depicted in FIG. 7 may be substantially similar to those discussed above. For the sake of brevity, another description of these elements is omitted.

As depicted in FIG. 7, second bottom fabric 620 may be configured to form a perimeter or boundary around anti-fatigue mat 300. Second bottom fabric 620 may include a plurality of orifices 505 that are configured to receive coupling mechanisms 630.

Lead-in 610 may be comprised of multiple parts configured to be positioned adjacent to the edges of anti-fatigue mat 300 and over second bottom fabric 620. Responsive to positioning lead-in 610 over second bottom fabric 620, coupling mechanisms 630 may be inserted through the orifices 705 positioned on second bottom fabric 620.

Additionally, lead-in 610 may create additional weight to anti-fatigue mat system 600, which in combination with the non-slip material of second bottom fabric 620 may be configured to hold anti-fatigue mat 300 in place.

Figure 8:
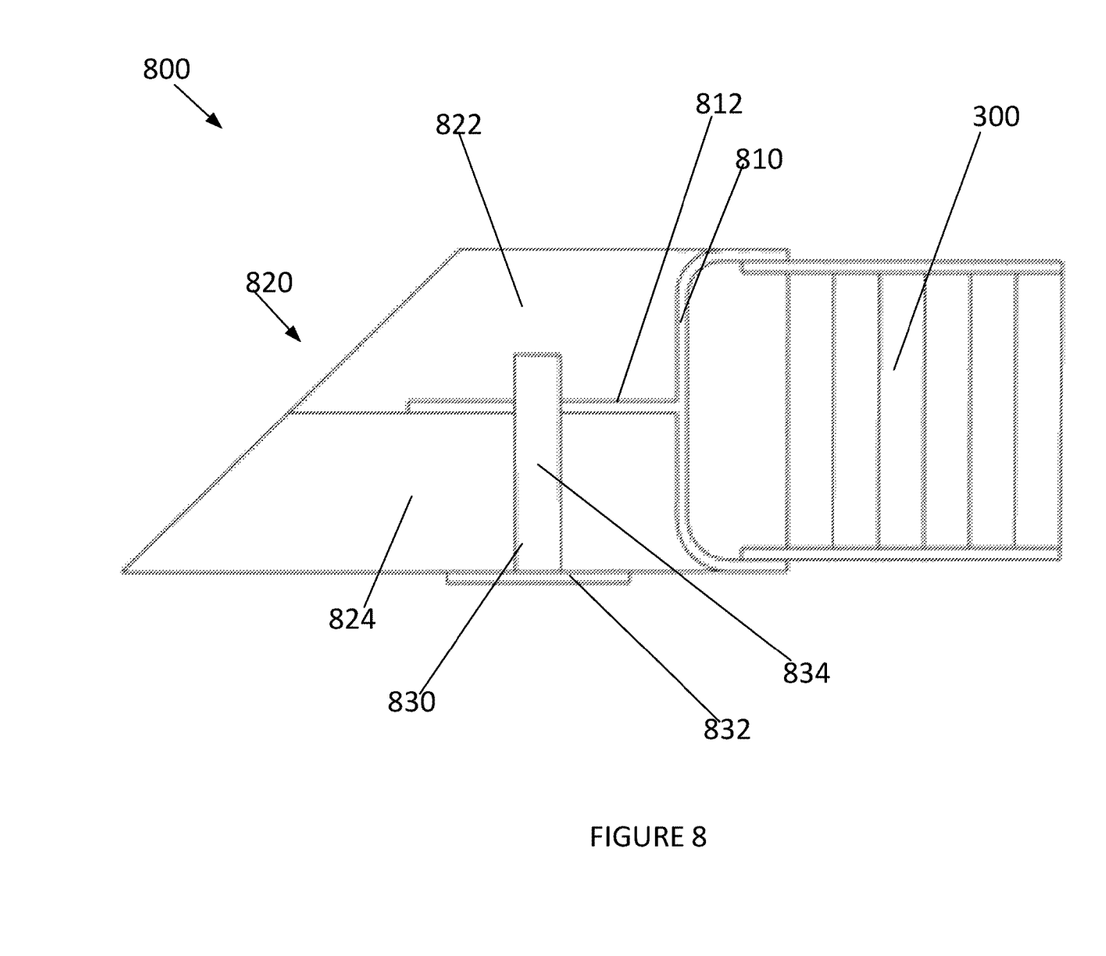
FIG. 8 depicts a side view of an anti-fatigue mat system, according to an embodiment.

FIG. 8 depicts a side view of an anti-fatigue mat system 800, according to an embodiment. Elements depicted in FIG. 8 may be substantially similar to those discussed above. For the sake of brevity, another description of these elements is omitted. Anti-fatigue mat system 800 may include end cap 810, lead-in 820, and coupling mechanism 830.

End cap 810 may be configured to be positioned adjacent to an edge of anti-fatigue mat 300. End cap 810 may include a tab 812 that is configured to project away from a sidewall of end cap 810. Tab 812 may extend away from end cap 810 in a direction parallel to a floor surface and perpendicular to tensional support members within anti-fatigue mat 300. Tab 812 may be configured to be inserted into lead-in 820. In embodiments, tab 812 may have a length that extends past the intersection of the sloped surface and the flat surface of lead-in 820. Tab 812 may include an orifice positioned through tab 812. The orifice may be configured to receive a projection 834 positioned on coupling mechanism 830. In embodiments, the orifice may be positioned between the intersection of the sloped surface and the flat surface of lead-in 820 and the sidewall of end cap 810.

Lead-in 820 may be comprised of multiple layers 822 and 824. First layer 822 may be positioned over and adjacent to second layer 824. In embodiments, tab 812 may be configured to extend into first layer 822, second layer 824, or an intersection of first layer 822 and second layer 824.

First layer 822 and second layer 824 may include hollow channels, passageways, groove, recessions, etc. that are configured to align with each other. A first hollow channel positioned within first layer 822 may extend into first layer 822, while a second hollow channel positioned within second layer 824 may extend through second layer 824. In embodiments, the first hollow channel and the second hollow channel may be configured to receive projection 834 positioned on coupling mechanism 830.

Coupling mechanism 830 may be a fastener, rivet, clasp, etc., and may include a base 832 and projection 834.

Base 832 may have a first diameter, and may be configured to be positioned below and adjacent to a bottom surface of lead in 820. The first diameter may be less than a length of tab 812.

Projection 834 may have a second diameter that is smaller than the first diameter, and projection 834 extend away from base 832 in a direction that is perpendicular to base 832 and tab 812. Projection 834 may be configured to be inserted through the second hollow channel positioned within second layer 824, through the orifice within tab 812, and into the first hollow channel positioned within first layer 822. Projection 834 may have a height that is greater than the height of second layer 824, but less than the height of lead-in 820. Responsive to inserting projection 834 through the orifices and hollow channels, lead-in 820, and anti-fatigue mat 300 may be removably coupled together.

Figure 9:
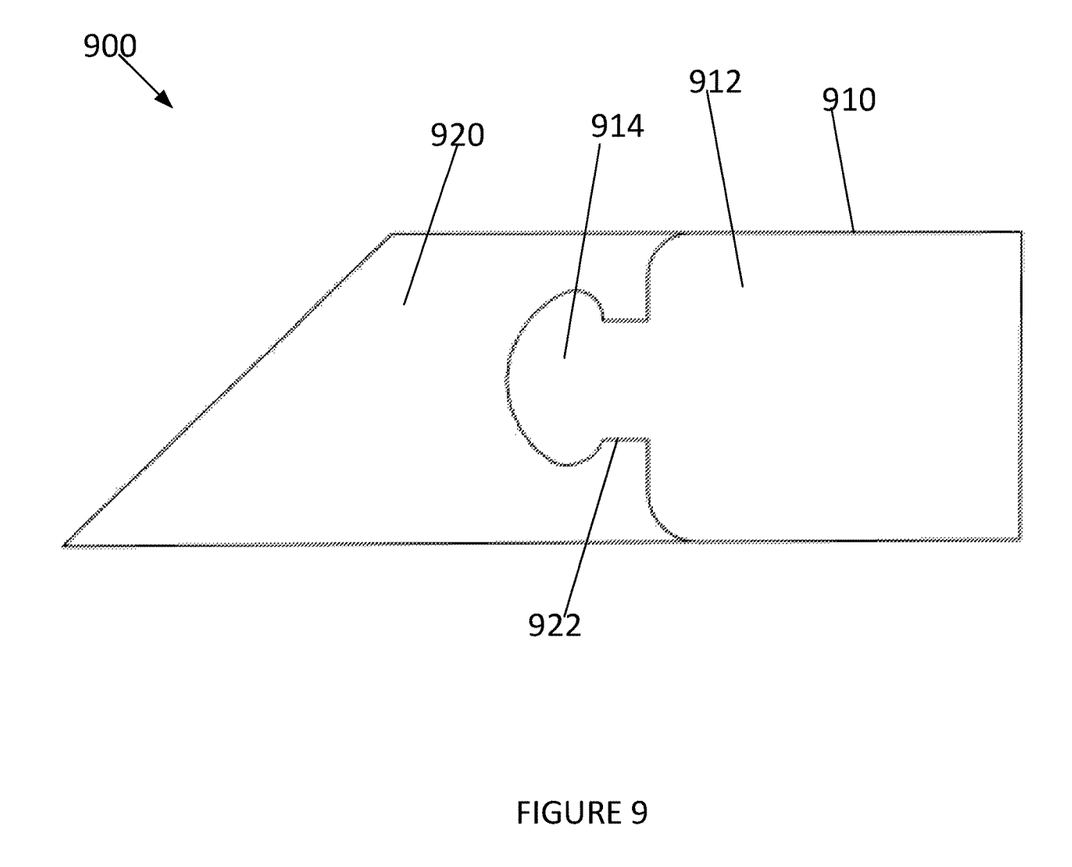
FIG. 9 depicts a side view of an anti-fatigue mat system with an anti-fatigue mat and lead-in, according to an embodiment.

FIG. 9 depicts a side view of an anti-fatigue mat system 900 with anti-fatigue mat 910 and lead-in 920, according to an embodiment. Elements depicted in FIG. 9 may be substantially similar to those discussed above. For the sake of brevity, another description of these elements is omitted.

Anti-fatigue mat 910 may be an inflatable anti-fatigue mat comprised of drop-stitched construction. Anti-fatigue mat 910 may include a body 912 and a dynamic sidewall 914. Body 912 and dynamic sidewall 914 of anti-fatigue mat 910 may be configured to be inflated and deflated. Responsive to inflating body 912 and dynamic sidewall 914, body 912 and dynamic sidewall 914 may expand and increase in volume. Dynamic sidewall 914 may be positioned on an edge of body 912, such that dynamic sidewall 914 extends away from body 912.

Lead-in 920 may be configured to be positioned adjacent to anti-fatigue mat 910. Lead-in 920 may be comprised of a semi-rigid, cushioned material. Lead-in 920 may include a slot 922 positioned on an end of lead-in 920. Slot 922 may be shaped and sized to correspond to dynamic sidewall 914, when dynamic sidewall 914 is inflated. In embodiments, dynamic sidewall 914 may be positioned within slot 922, and anti-fatigue mat 910 may be inflated. Once anti-fatigue mat 910 is inflated, the volume of dynamic sidewall 914 may increase such that dynamic sidewall 914 fills up slot 922. The pressure caused by dynamic sidewall 914 against slot 922 may couple lead-in 920 with anti-fatigue mat 910. Responsive to deflating, anti-fatigue mat 910, the volume of dynamic sidewall 914 may decrease. This may allow dynamic sidewall 914 to slide out of slot 922 to decouple anti-fatigue mat 910 and lead-in 920.

Figure 10:
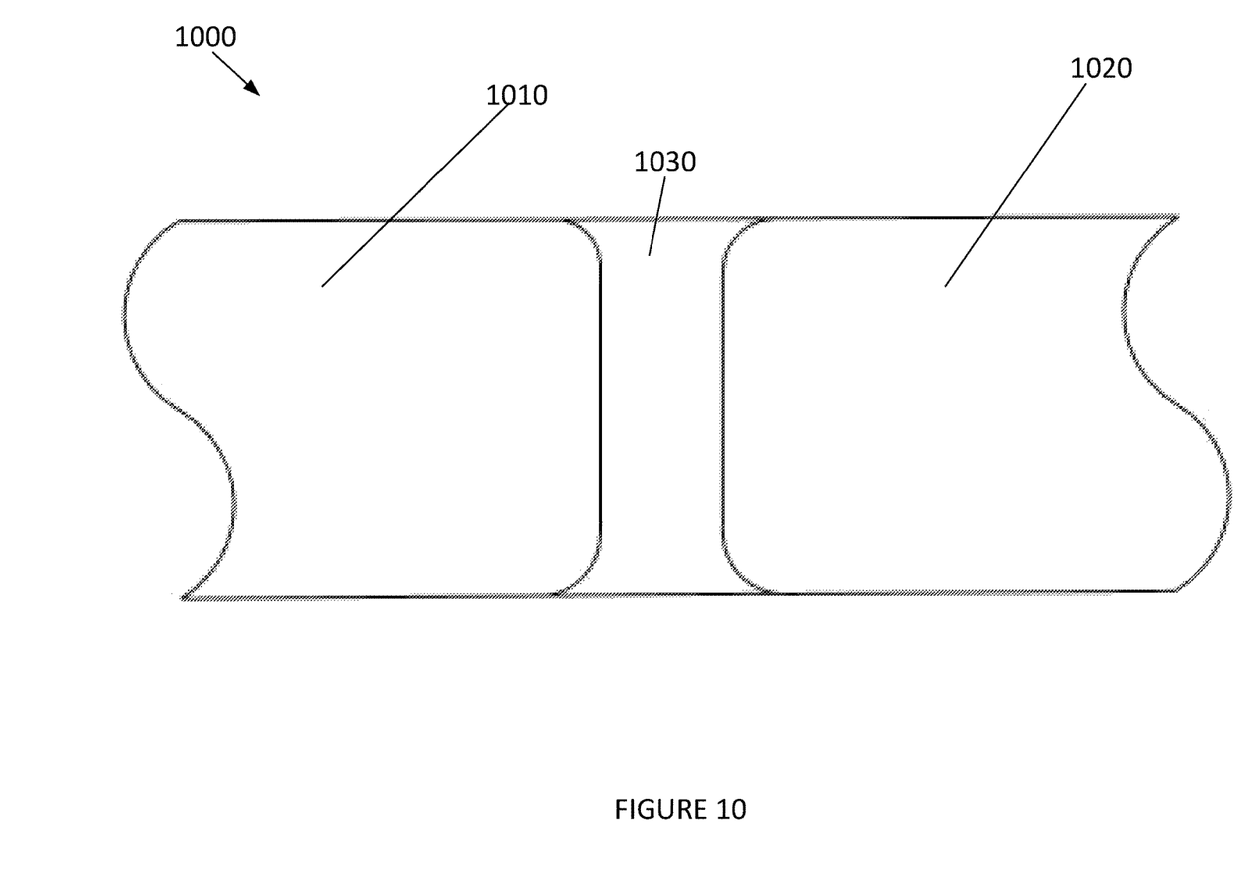
FIG. 10 depicts a side view of an anti-fatigue mat system with a first anti-fatigue mat, a second anti-fatigue mat, and bridging lead-in, according to an embodiment.

FIG. 10 depicts a side view of an anti-fatigue mat system 1000 with a first anti-fatigue mat 1010, a second anti-fatigue mat 1020, and bridging lead-in 1030, according to an embodiment. Elements depicted in FIG. 10 may be substantially similar to those discussed above. For the sake of brevity, another description of these elements is omitted.

Bridging element 1030 may be configured to couple first anti-fatigue mat 1010 and second anti-fatigue mat 1020. Bridging element 1030 may incorporate embodiments discussed above to couple the anti-fatigue mats 1010, 1020. By anti-fatigue mat system 1000 having a plurality of anti-fatigue mats that are removably coupled together, if necessary, a single anti-fatigue mat may be replaced.

Bridging element 1030 may utilize a first coupling mechanism positioned on a first side of bridging element 1030 to removable couple bridging element 1030 and first anti-fatigue mat 1010, and bridging element 1030 may utilize a second coupling mechanism positioned on a second side of bridging element 1030 to removable couple bridging element 1030 and second anti-fatigue mat 1020.

In embodiments, the coupling mechanism on the first side of bridging element 1030 may be the same as the coupling mechanism on the second side of bridging element 1030, or the coupling mechanisms may be different. For example, the first coupling mechanism and second coupling mechanism may both include coupling mechanism 630 as described and depicted in FIG. 6. However, in other embodiments, the first coupling mechanism may include coupling mechanism 630 as described and depicted in FIG. 6, and the second coupling mechanism may include dynamic sidewall 914 and slot 922 as described and depicted in FIG. 9.

In another embodiment, an anti-fatigue mat system may be manufactured by first creating a subassembly. The subassembly may include a drop-stitch bladder with an additional top fabric sheet attached to a top surface of the drop-stitch bladder. The edges of the additional top fabric sheet may extend beyond the drop-stitch bladder perimeter. This subassembly may then be positioned into a mold whose interior may substantially be the same shape as an anti-fatigue mat system with lead-ins. The mold may initially include a closed bottom and an open top surface.

Expanding foam may be sprayed into the open top surface of the mold. At this point, the drop-stitch bladder may be deflated or, in embodiments, inflated to exceed the blowing pressures of the expanding foam. Next, the open top surface of the mold may be closed, clamping the extra top fabric in the process, and the expanding foam may expand to the shape of the mold. This may create an anti-fatigue mat with a drop-stitch bladder encased, and with foam forming the lead-ins and bottom surface. In other words, an anti-fatigue mat system may be created by inflating the drop-stitch bladder while an over-mold of foam forms the lead-ins and bottom surface.

In other embodiments, the drop stitch bladder may be inserted into the open top surface of the mold without any extra fabric sheet being first attached. In this embodiment, the top surface of the mold may be shut and clamps or shuts off against the drop-stitch bladder itself. Similar to the manner in which a shoe sole is added to a shoe upper, the lead-ins may be coupled to the drop-stitch bladder. In other embodiments, the lead-in may be coupled to the drop-stitch bladder via adhesives, welting or any other coupling process. In other embodiments, a gel or foam top layer may be included to increase comfort, weight and puncture resistance.

Embodiments may create a unified anti-fatigue mat with permanently coupled lead-ins, and may completely seal the bottom surface and edges of the unified anti-fatigue mat. The unified anti-fatigue mat may reduce punctures while minimizing debris from being positioned between the body of the anti-fatigue mat and lead-ins.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. An anti-fatigue mat system comprising:
   an anti-fatigue mat configured to be inflated, the anti-fatigue mat having a flat planar surface;
   tensional support members extending from an upper surface to a lower surface of the anti-fatigue mat, the tensional support members being threads;
   a lead-in configured to be positioned proximate to a sidewall of the anti-fatigue mat, the lead-in including a flat bottom surface with a first distal end, a top surface with a second distal end, the first distal end being positioned further from the anti-fatigue mat than the second end, the lead-in having varying heights along an inclined planar surface, the inclined planar surface extending from the first distal end to the second distal end wherein the height of the top surface of the lead-in proximate to the first distal end is shorter than the height of the top surface of the lead-in proximate to the second distal end,
   an end cap being configured to be positioned between the lead-in and the anti-fatigue mat, the end cap extending from the upper surface to the lower surface of the anti-fatigue mat, wherein an inner surface of the lead-in corresponds to an outer surface of the end-cap.

2. The system of claim 1, wherein the lead-in includes tensional support members extending from the top surface of the lead-in to a bottom surface of the lead-in, the tensional support members positioned proximate to the edge of the lead-in being shorter than the tensional support members of the lead-in positioned proximate to the sidewall of the anti-fatigue mat.

3. The system of claim 1, further comprising:
a plurality of lead-ins, each of the plurality of leads-ins being configured to be positioned proximate to an edge of the anti-fatigue mat, wherein adjacent lead-ins include ends that form complementary angles.

4. The system of claim 1, further comprising:
a first top fabric configured to be positioned over the anti-fatigue mat;
a first bottom fabric configured to be positioned below the anti-fatigue mat;
a second top fabric configured to be positioned over the first top fabric and the lead-in;
a second bottom fabric configured to be positioned under the first bottom fabric, wherein at least a portion of the second top fabric is configured to be positioned below the second bottom fabric.

5. The system of claim 1, further comprising:
a coupling mechanism including a base and a projection, the projection extending in a direction perpendicular to a floor surface, wherein the projection is configured to be inserted into a hollow channel within the lead-in.

6. The system of 5, further comprising:
a plurality of hollow channels positioned within the lead-in;
a bottom fabric with a perimeter extending past edges of the anti-fatigue mat, the bottom fabric including orifices extending through the bottom fabric that are configured to align with the plurality of hollow channels, wherein a plurality of coupling mechanisms are configured to be inserted through the orifices into the plurality of hollow channels.

7. The system of claim 6, further comprising:
a first section of the lead-in positioned above a second section of the lead-in, the first section of the lead-in including a first hollow channel extending into the first section, the second section of the lead in including a second hollow channel extending through the second section;
an end cap being configured to be positioned between the lead-in and the anti-fatigue mat, the end cap including a tab extending into the lead-in in a direction in parallel to a base of the coupling mechanism, the tab including an orifice extending through the tab.

8. The system of claim 1, wherein the anti-fatigue mat includes an inflatable sidewall, and the lead-in includes a slot, responsive to inflating the inflatable sidewall the anti-fatigue mat is configured to be coupled with the lead-in.

9. The system of claim 1, further comprising:
a bridging element configured to couple a first anti-fatigue mat and a second anti-fatigue mat.

* * * * *